Dec. 19, 1950   A. BARNES   2,534,654
ULTRA-VIOLET ABSORBING FILTER
Filed Jan. 11, 1946

INVENTOR.
Arthur Barnes
BY
Donald L. Brown
Attorney

Patented Dec. 19, 1950

2,534,654

UNITED STATES PATENT OFFICE 2,534,654

ULTRAVIOLET ABSORBING FILTER

Arthur Barnes, Waltham, Mass., assignor to Polaroid Corporation, Cambridge, Mass., a corporation of Delaware Application January 11, 1946, Serial No. 640,594

4 Claims. (Cl. 88—109)

This invention relates to ultraviolet light absorbers particularly useful in photographic elements to control exposure between a plurality of light-sensitive emulsions, to filter materials including ultraviolet light-absorbing layers incorporated in photosensitive elements, such as photographic films, papers and the like, and to methods of forming such absorbers.

Important objects of the invention are the provision of ultraviolet light absorbers having substantially water-impenetrable or impermeable particles which are capable of resisting strong chemical reagents, which are absorptive of at least a portion of the ultraviolet region of the spectrum while transmitting visible light and which are incorporated as fine dispersions in a substantially transparent, water-permeable or hydrophilic layer or carrier, such as gelatin, polyvinyl alcohol and the like, and the provision of photosensitive elements having absorbers of the character described associated therewith as barriers separating a plurality of photosensitive layers whereby to permit control of the exposure of the photosensitive layers.

Other objects of the invention reside in the provision of substantially water-impenetrable, chemical resistant media which is absorptive of ultraviolet light while transmitting visible light and which is incorporated in water-permeable, substantially transparent carriers as fine dispersions to give substantially clear, colorless, and transparent layers containing such media as a multiplicity of particles distributed therein and especially in the provision of ultraviolet absorptive media which is incorporated in water-permeable or water-penetrable carriers employed as barrier layers in photosensitive elements and which will remain in a substantially unchanged condition throughout a multiplicity of photographic processing steps employing treatment with water and photographic reagents and hence may be retained in the elements after completion of processing, as well as in the provision of ultraviolet light-absorbing means of the character described comprising a water-permeable or hydrophilic carrier in which there are dispersed particles of a substantially water-impermeable material such as a hydrophobic resin, wax or plastic which contain an ultraviolet light- absorbing material.

Further objects of the invention are to provide methods for forming novel ultraviolet light-absorbing means and especially the formation of filter means of this character which are transparent in visible light while absorbing ultraviolet light, which are resistant to chemical attack and strong photographic processing solutions including chromic acid and which because of their transparency when used in structures forming photosensitive elements need not be removed therefrom after exposure and development of such elements.

Still further objects of the invention are to provide methods for obtaining dispersions in a water-permeable or water-penetrable carrier of particles of a water-impermeable material which contain or which are impregnated or infused with an ultraviolet light-absorbing compound; to make use of the ultraviolet absorbing properties of organic compounds, especially the azines, by protecting the same in a substantially water-impermeable resin, wax or plastic by mixing the absorber and the protector therefor in an organic solvent in which they are miscible and dispersing the dissolved materials as small particles in a layer of a water-permeable substance such as gelatin or polyvinyl alcohol; and to form ultraviolet light-absorbing media by dissolving a substantially water-impermeable plastic and an ultraviolet light-absorbing material in a mutual organic solvent, mixing the solution with a hydrophilic or water-penetrable material and forming the mixture into a layer.

Other objects of the invention will in part be obvious and will in part appear hereinafter.

The invention accordingly comprises the several steps and relation of one or more of such steps with respect to each of the others and the article possessing the features, properties, and the relation of elements which are exemplified in the following detailed disclosure, and the scope of the application of which will be indicated in the claims.

For a fuller understanding of the nature and the objects of the invention, reference should be had to the following detailed description, taken in connection with the accompanying drawing in which.

Figure 1:
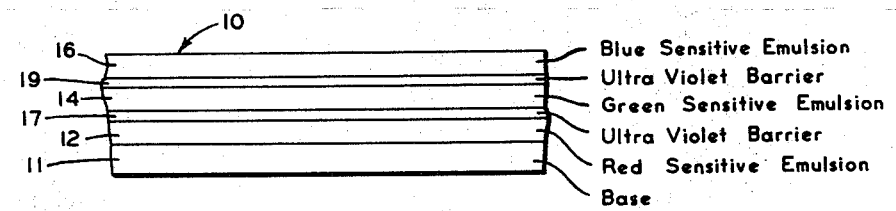
Figure 1 is a diagrammatic view of one type of photosensitive element with which the invention may be practiced.

As indicated, the invention concerns an ultraviolet light-absorbing filter or barrier in the form of a substantially transparent layer of a water-permeable or hydrophilic material which acts as a carrier for particles of a substantially water-impermeable or impenetrable material, such as wax, resin, or plastic, which are dispersed in the layer and which contain or are impregnated or infused with ultraviolet light-absorbing material, all of such materials being substantially transparent in visible light. While ultraviolet light-absorbing media of this type are adapted to a variety of uses, they are particularly suitable as light barrier means between light-sensitive or emulsion layers of photosensitive elements having a plurality of superposed light-sensitive layers all of which must be contacted by photographic processing solutions. The permeability of the carrier material used in the formation of the barrier layer will permit processing solutions to permeate through a barrier layer of this type and into the element in which it is employed. At the same time, the protection afforded by the water-impermeable compound for the ultraviolet light-absorbing material provides particles which are resistant to chemical attack and substantially prevents the light-absorbing compound from being washed out of the carrier while the transparent property of all the materials involved allows the barrier to be permanently retained in a photosensitive element.

Briefly stated, the invention may be carried into effect by the use of a compound highly absorptive to light in the ultraviolet region of the spectrum while having little or no absorption in the visible portion. Satisfactory compounds of this character are of a hydrophobic character and are substantially water-insoluble but are generally soluble in organic solvents. The ultraviolet light-absorbing compound is infused into a resin, wax or plastic which is substantially impermeable to water, which is chemically resistant and which preferably has a refractive index approximately the same as that of the water-permeable carrier material in which it will subsequently be incorporated.

Impregnation of the water-impermeable material with the ultraviolet absorptive compound is effected by their solution in a mutual organic solvent which may be evaporated off at a suitable point in the formation of the barrier layer. In preferred practice, the resin, wax or plastic is dissolved in the mutual solvent and thereafter the ultraviolet absorptive material is dissolved therein. This solution is then mixed, by mechanical means, with a solution of the water-permeable carrier material to which it is desired to impart the property of absorbing ultraviolet light. Mixing of the two solutions continues until there is obtained in the hydrophilic carrier material a very fine dispersion of particles comprising water-impermeable material impregnated or infused with ultraviolet light-absorbing material, the latter material being either partially or completely encased or covered by the protecting water-impermeable material. The emulsion formed in this manner is then cast or coated on a suitable support, which may be a photosensitive layer, and is dried by methods known to the art, the solvent for the ultraviolet light-absorbing material and the water-impermeable material together with any water being evaporated at this time.

In lieu of the practice just described, it is possible to cast the solution of the ultraviolet light-absorbing material and the water-impermeable material into a sheet by spreading the same on a support and evaporating off the mutual solvent by drying. The sheet thus formed may then be ground to provide the desired small particles which are mechanically mixed with an aqueous solution of hydrophilic carrier material until thoroughly dispersed throughout the same, the mixture being cast or coated on a support as heretofore noted to form the desired barrier layer.

Saturation of the resin, wax or plastic with the ultraviolet absorptive compound is generally desirable. Concentration of the material comprising the absorptive compound with the water-permeable material is generally desired to be the minimum which will result in a satisfactory absorbing barrier. What then is a satisfactory absorbing barrier will depend upon the absorption efficiency which is required thereof. The absorption efficiency of the barrier layer for light of wavelengths absorbed by the light-absorptive material incorporated therein is proportional to the quantity of such material present in the finished barrier layer. However, to serve satisfactorily as an absorber of ultraviolet light, at least for photographic purposes, the barrier layer need only be substantially opaque to light in the ultraviolet region wherein a photosensitive layer which is protected from exposure by the barrier is actinic, at least to the extent that any actinic light transmitted by the barrier during an exposure of an adjacent photosensitive layer will not produce a developable image in the photosensitive layer protected by the barrier.

Within these limits, the required absorption efficiency of a barrier layer will be affected by the conditions of its use and such conditions will permit a latitude in the proportions of the materials forming the barrier. For example, when these barriers are employed in photosensitive elements as exposure control means between emulsion layers which are sensitive in at least a part of the ultraviolet region of the spectrum, the proportions of the various materials in the barrier will be influenced by such factors as the exposing light source, that is the intensity of the source as well as the portion of the ultraviolet region of the spectrum which it covers, also the portion of the ultraviolet to which the photosensitive emulsions are sensitive and in addition the particular absorption characteristics in the ultraviolet of the particular light-absorbing compound employed.

The invention will be more fully understood when considered in connection with the following detailed example of the production of a gelatin layer, water-permeable as a whole, and rendered opaque to ultraviolet light by having incorporated therein, in the form of a very fine dispersion, particles of canada balsam which contain furfuralazine, a colorless, highly ultraviolet absorbing compound, which is nonhydrophilic.

The process proceeds by dissolving canada balsam, a resin having approximately the same index of refraction as gelatin, in a solvent in which furfuralazine is miscible, by first preparing a saturated solution at room temperature of canada balsam in xylene and then saturating this solution at room temperature with furfuralazine. This resin-light absorber solution is added to a 7% aqueous solution of gelatin and mixed by mechanical means, such as mixer or stirrer, until a very fine dispersion of the resin-light absorber in the gelatin is obtained. The quantity of resin-light absorber solution added to the gelatin is limited to that resulting in a stable dispersion which will not separate during casting or coating and drying procedures to result in a layer having non-uniform absorptive properties. Proportions of from 1:2 to 1:4 by volume of resin-light absorber to gelatin have been found to give stable dispersions and finished light barriers of suitable character. A proportion of 8:25 by volume of resin-light absorber solution to aqueous 7% gelatin may be named as particularly satisfactory for photographic work. However, concentrations and proportions other than those heretofore set forth may be employed in providing a filter of suitable stability, it being noted that these are illustrative and are subject to variation to fit the demands of filter quality or efficiency desired.

The resulting emulsion from the dispersion of the resin-light absorber solution in the aqueous gelatin solution is cast or coated to form a layer which is dried by any suitable or standard method. Before casting or coating, the emulsion appears milky, but upon drying a clear, colorless, and transparent material is obtained comprising gelatin as the carrier for a multiplicity of very small, water-resistant resin particles which have been rendered absorptive of ultraviolet light.

An ultraviolet light-absorbing material which is substantially transparent throughout the visible region of the spectrum is preferred for use with the invention. Materials possessing these properties may be found in the azines which are organic compounds having the general formula

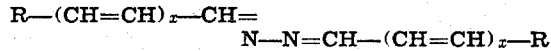

where R is an aromatic group and $x$ is either zero or one. Preferred azines are furfuralazine and cinnamalazine which are excellent ultraviolet absorbers and which are substantially transparent throughout the visible region of the spectrum. In general, azines may be simply prepared by mixing appropriate volumes of their corresponding aldehyde and a solution of hydrazine hydrate in water or dilute ethyl alcohol.

Many other materials may also be employed as ultraviolet light absorbers. To name a few such materials, mention may be made of p-hydroxybenzaldehyde, as well as certain aldehyde condensation products of methyl pyridines. The azines, however, afford the preferred materials.

The resins, waxes or plastics in which the light-absorbing compounds are directly incorporated, are preferably chosen to have indices of refraction which closely approximate those of the water-permeable materials generally employed as carriers for photo-sensitive substances and as already noted are selected from substantially water-impermeable or hydrophobic materials. Examples thereof comprise canada balsam, paraffin, carnauba wax and cellulose esters including mixed esters, such as cellulose acetate, cellulose nitrate, cellulose acetate butyrate, and cellulose acetate propionate as well as the vinyl acetate-chloride copolymers and suitable acrylates, methacrylates, and hydrophobic nylon type plastics.

The solvent materials employed in this invention for bringing about solution of the ultraviolet light-absorbing compounds in the water-impermeable resins, waxes or plastics, are characterized by being solvents for both types of materials and thereby inducing mutual miscibility of the light-absorbing compounds and the resins, waxes or plastics. These solvent materials include the more soluble aromatic hydrocarbons, such as xylene, benzene and toluene, and other organic solvents, such as acetone, methanol, ethanol, ether and ethyl acetate. The solvent material is chosen which will best accomplish the purpose desired with the particular absorptive compound and resin, wax or plastic selected.

Any hydrophilic material of a substantially transparent character may be employed for the water-permeable carrier in which the ultraviolet light-absorbing particles are dispersed. Examples thereof are found in the class of materials usable as carriers for light-sensitive substances in the photographic art and comprise gelatin, fish glue, albumen, and the like as well as transparent, hydrophilic, high molecular weight, linear polymers which are capable of having their molecules substantially oriented. Examples of suitable polymers of the latter class which are characterized by being orientable are polyvinyl alcohol, polyhydroxy alkane, partially hydrolyzed polyvinyl acetals and polyvinyl alcohol esters, amylose and regenerated cellulose. In addition, other plastics such as hydrophilic polyamides or nylon type plastics may be employed. Of the materials herein named, gelatin and polyvinyl alcohol are preferred.

Barrier layers or filters of the character heretofore described are particularly desirable to allow selective exposure of several photosensitive layers and are useful to avoid color distortion or to obtain improved color balance in the formation of multicolor images. As an example, consideration may be given to a photographic film or paper and to practices for forming three-color images therein. For the purpose of illustrating such use of the invention, a film 10 has been disclosed in Fig. 1 as comprising a base 11 of conventional support material, such as cellulose acetate, cellulose nitrate, cellulose acetate butyrate or the like, upon which are superposed light-sensitive emulsion layers 12, 14 and 16 which are rendered respectively red-, green-, and blue-sensitive. The emulsions may comprise specially sensitized silver halide carried in gelatin or polyvinyl alcohol or other hydrophilic material. Layer 14 is separated from the layer 16 by an ultraviolet light-absorbing barrier 19 of the character heretofore described and from the emulsion layer 12 by a similar barrier layer 17.

By one process for image formation whereby balanced color "negatives" are formed, film 10 is exposed with white light to a suitable subject and developed, fixed and washed to provide silver images in each of the layers. A suitable yellow dye such as tartrazine may be incorporated in the red- and green-sensitive emulsions 12 and 14 in the event that they retain some sensitivity in the blue region of the spectrum so that no blue light is transmitted to these emulsion layers on the initial exposure of the film. As will appear, washing out of the yellow dye during processing which follows the initial exposure of the film is immaterial.

The next step in the process is to convert the developed silver in film 10 to silver halide. This may be carried out by treatment in a solution of potassium ferricyanide and potassium chloride as will be understood in the art, following which the film is washed. To insure the removal of unreacted silver molecules which might remain in the emulsion layers 12, 14 and 16, film 10 is now bathed in a solution of potassium dichromate and sulfuric acid, such solution being commonly known as chromic acid and providing an extremely strong oxidizing agent. The film is again washed and the light sensitivity of the silver halide improved by treatment in a weak bisulfite solution after which the film is dried.

The resulting silver halide, in this case silver chloride, is no longer sensitive to various colors in the manner of the original silver halide emulsions but is "color blind" in that the emulsion layers 12, 14 and 16 are substantially alike in sensitivity to ultraviolet and to blue light.

Color image formation proceeds by first exposing the emulsion 16 with ultraviolet light so filtered that it may be completely absorbed by the ultraviolet barrier 19, following which the film is developed in a suitable color-forming developer to form a yellow image and a silver image in the top layer and the film is washed.

The film is again re-exposed with ultraviolet light, this time through the support 11. Since ultraviolet light is employed for exposure, emulsion 14 which is sensitive thereto will remain unaffected due to the absorption of the exposing light by the barrier 17. A cyan image with a silver image is then formed in the bottom layer by developing with a suitable color-forming developer, following which the film is again washed.

The middle emulsion layer 14 of the film may now be rendered developable by exposure to white light preferably through the support 11. Emulsion 14 may now be developed with a suitable color-forming developer which deposits a magenta image and silver image and is then washed. In lieu of a third exposure, the middle emulsion may be developed with a fogging developer which will develop unexposed silver halide and simultaneously deposit a dye.

Following the formation of the three color images, the developed silver in the film may be removed by treatment with Farmer's reducer. The result of this treatment is to leave only the color images visible in the film since light-absorbing material which is substantially transparent over the visible region of the spectrum has been employed in the barriers 17 and 19.

The photographic process which has just been described provides dye images of optical densities which are directly proportional to the exposure light of the initial exposure as well as dye images which are complementary in light values to the light values of the subject being reproduced, it being noted that the dye images are substantially identical to the silver images first formed in the photographic elements. This photographic process affords an excellent illustration of the advantages of ultraviolet light-absorbing barriers of the character forming the subject of this invention. As disclosed, color image formation is carried out with the use of a variety of processing solutions yet because of the manner in which the ultraviolet light-absorbing material is protected in barrier layers of the invention it will neither be washed out or attacked by these solutions and hence need not be replaced during processing. Furthermore, due to the transparent nature of the layer, the absorptive material may be allowed to remain permanently in a photosensitive element following image formation therein.

Figure 2:
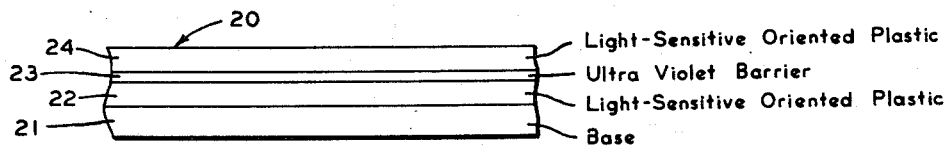
Fig. 2 is a diagrammatic view of another type of photosensitive element with which the invention may be practiced.
Figure 3:
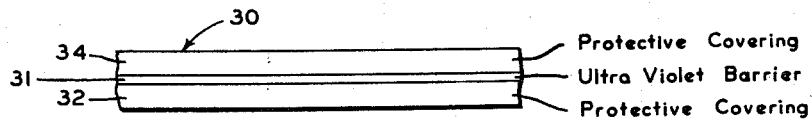
Fig. 3 is a diagrammatic view of an ultraviolet light filter.

Other types of films with which barriers of this character are particularly useful may be found in films having emulsion layers of similar sensitivity extending at least in part into the ultraviolet region of the spectrum. Films of this latter type are especially adapted for the formation of light-polarizing images known as vectographs, that is to say images having a contrast or optical density which is a function of the vibration direction of the incident light. A film 20 in which light-polarizing stereoscopic images may be formed is disclosed in Fig. 2 and comprises a base 21 and emulsion layers 22 and 24 supported thereon and separated by an ultraviolet light-absorbing barrier 23 of the character heretofore described. Emulsion layers 22 and 24 comprise transparent, molecularly oriented, linear polymeric plastic material which may be sensitized with silver halide, a preferred plastic being polyvinyl alcohol. The direction of orientation of the molecules of the emulsion layer 22 is at 90° to the direction of orientation of the molecules of the emulsion layer 24.

Stereoscopic image formation in the film 20 may proceed by printing with ultraviolet light through one negative of a stereoscopic pair of negatives onto the top emulsion 24 and through the other negative of the pair with ultraviolet light directed through the base 21 and onto emulsion layer 22, the negatives being suitably registered. Latent images formed in emulsions 22 and 24 may be suitably treated by procedures not forming a part of this invention to convert them to dichroic material and provide oppositely light-polarizing images in the layers 22 and 24.

As intimated, the barriers of the invention have a variety of uses and need not necessarily be employed in photographic elements. For example, barrier layer 31 may be laminated between layers 32 and 34 of suitable covering or protective material, such as glass or any of the water-impermeable or hydrophobic plastics heretofore mentioned, and the structure 30 used as an ultraviolet filter, spectacle or goggle lens or the like.

The term "hydrophilic" as used in the specification and claims refers to materials which show an affinity for water or have the ability to absorb or adsorb water, that is, materials which are water-permeable, while the antonym of hydrophilic, that is "hydrophobic" as used herein refers to materials which are substantially water-impermeable.

From the foregoing it will be appreciated that the aims and objects of the invention have been attained in that novel ultraviolet light absorbers, particularly useful as barrier layers in photosensitive elements have been provided, these barriers being of a character which are resistant to chemical attack, which will withstand washing in photographic processing solutions and which are substantially transparent in visible light and therefore may be permanently retained in photosensitive elements. Further, novel processes have been devised whereby ultraviolet filter means of the character set forth may be readily formed.

Since certain changes in carrying out the above process, and certain modifications in the article which embody the invention may be made without departing from its scope, it is intended that all matter contained in the above description shall be interpreted as illustrative and not in a limiting sense.

What is claimed is:

1. An ultraviolet light absorber comprising a carrier layer of a substantially transparent hydrophilic material, ultraviolet light-absorbing particles dispersed throughout said carrier, said particles being formed of a substantially transparent, water-impermeable material having furfuralazine contained therein.

2. An ultraviolet light absorber of the character set forth in claim 1 wherein the transparent hydrophilic material of the carrier layer thereof is gelatin.

3. An ultraviolet light absorber of the character set forth in claim 1 wherein the water-impermeable material containing furfuralazine is canada balsam.

4. An ultraviolet light absorber of the character set forth in claim 1 wherein the transparent hydrophilic material of the carrier layer thereof is gelatin and wherein the water-impermeable material containing furfuralazine is canada balsam.

ARTHUR BARNES.

REFERENCES CITED

The following references are of record in the file of this patent:

UNITED STATES PATENTS

| Number | Name | Date |
|---|---|---|
| 1,290,794 | Sheppard | Jan. 7, 1919 |
| 2,130,212 | Watkins | Sept. 13, 1938 |
| 2,160,907 | Richardson | June 6, 1939 |
| 2,172,262 | Schinzel | Sept. 5, 1939 |
| 2,241,239 | Carroll et al. | May 6, 1941 |
| 2,269,158 | Martinez | Jan. 6, 1942 |
| 2,304,940 | Mannes et al. | Dec. 15, 1942 |
| 2,310,228 | Gaspar | Feb. 9, 1943 |
| 2,311,020 | Bennett et al. | Feb. 16, 1943 |
| 2,327,764 | Carroll | Aug. 24, 1943 |
| 2,340,882 | Kendall | Feb. 8, 1944 |
| 2,356,849 | Horback | Aug. 29, 1944 |
| 2,364,112 | Van Every | Dec. 5, 1944 |
| 2,370,244 | Jacobs | Feb. 27, 1945 |
| 2,418,627 | Dimmick | Apr. 8, 1947 |

FOREIGN PATENTS

| Number | Country | Date |
|---|---|---|
| 540,365 | Great Britain | Oct. 15, 1941 |